(12) United States Patent  
Elsner (10) Patent No.: US 8,047,356 B2
(45) Date of Patent: Nov. 1, 2011

(54) RADIUS BELT WITH IMPROVED STIFFNESS

(75) Inventor: Dietmar Elsner, Eimeldingen (DE)

(73) Assignee: Habasit AG, Reinach (CH)

( * ) Notice: Subject to any disclaimer, the term of this patent is extended or adjusted under 35 U.S.C. 154(b) by 490 days.

(21) Appl. No.: 12/806,264

(22) Filed: Sep. 24, 2008

(65) Prior Publication Data

US 2010/0307892 A1   Dec. 9, 2010

Related U.S. Application Data

(63) Continuation of application No. 11/492,349, filed on Jul. 25, 2006, now abandoned.

(51) Int. Cl.
*B65G 17/38* (2006.01)
(52) U.S. Cl. .......................... 198/853; 198/852; 198/851
(58) Field of Classification Search .................. None
See application file for complete search history.

(56) References Cited

U.S. PATENT DOCUMENTS

| | | | |
|---|---|---|---|
| 3,269,528 A | 8/1966 | Leedy | |
| 4,972,942 A | 11/1990 | Faulkner | |
| 5,058,732 A | 10/1991 | Lapeyre | |
| 5,253,749 A * | 10/1993 | Ensch | 198/850 |
| 5,379,883 A * | 1/1995 | Damkjaer | 198/853 |
| 5,598,916 A | 2/1997 | Horton et al. | |
| 5,645,160 A | 7/1997 | Palmaer et al. | |
| 6,006,898 A | 12/1999 | Odink | |
| 6,196,381 B1 | 3/2001 | Kato et al. | |
| 6,330,941 B1 * | 12/2001 | Guldenfels | 198/853 |
| 6,382,405 B1 | 5/2002 | Palmaer | |
| 6,516,944 B2 * | 2/2003 | Guldenfels | 198/853 |
| 6,615,979 B2 | 9/2003 | Etherington et al. | |
| 6,662,938 B2 | 12/2003 | Damkjaer | |
| 6,837,367 B1 | 1/2005 | Klein et al. | |
| 7,070,043 B1 | 7/2006 | MacLachlan et al. | |
| 2001/0050214 A1 | 12/2001 | Guldenfels | |
| 2002/0195321 A1 | 12/2002 | Guldenfels | |
| 2003/0024479 A1 | 2/2003 | Kashiwaya et al. | |

FOREIGN PATENT DOCUMENTS

| | | |
|---|---|---|
| EP | 1 260 459 A1 | 11/2002 |
| EP | 1 270 454 A1 | 1/2003 |
| WO | 99/48779 | 9/1999 |

* cited by examiner

*Primary Examiner* — Kavel Singh
(74) *Attorney, Agent, or Firm* — Hodgson Russ LLP

(57) ABSTRACT

A belt module having an intermediate section including a cross rib having a corrugated portion. The intermediate section also has a web extending along the length of the intermediate section and disposed adjacent to the cross rib. The module has a first and a second plurality of link ends extending outward from the intermediate section and having a transverse opening defined therein. The link ends are formed by a pair of spaced apart link members that are connected by a end portion. The link ends have a slot or opening defined therein from the top to the bottom of the module. The slot is bordered by the inside walls of the link members. The corrugated portion of the cross rib has a reach bar portion extending between first and second link ends and has a border portion disposed adjacent to the slot formed in the link ends.

23 Claims, 7 Drawing Sheets

RADIUS BELT WITH IMPROVED STIFFNESS

CROSS-REFERENCE TO RELATED APPLICATIONS

This application is a continuation of U.S. non-provisional patent application Ser. No. 11/492,349, filed Jul. 25, 2006, the disclosure of which is incorporated herein by reference.

FIELD OF THE INVENTION

This invention relates to conveyor belts and, more particularly, to modular plastic conveyor belts formed of rows of plastic belt modules pivotally interlinked by transverse pivot rods. Modular conveyor belts may be straight running or capable of negotiating a curved path. Belts that are capable of turning are usually referred to as radius or turn belts. The present invention pertains to radius belts.

BACKGROUND OF THE INVENTION

Radius belts are used in various applications for material handling as well as for food processing. For processes with long dwell times, spiral conveyors are commonly used. It has been known to use modular belts constructed of steel for these applications. However, the wear on the belts may produce blackening of the steel which contaminates the foodstuff. Also, belts made of steel are typically heavy, expensive and costly to repair. In response to some of these issues, it has been known to use plastic belt modules with steel pivot rods. These belts address some of the drawbacks but still suffer from the blackening problems. Also, steel rods concentrate pulling forces in a radius belt at one single link, whereas plastic rods are usually flexible enough to distribute the load onto two or more of the outermost links of the belt. Accordingly, it is preferable to form a belt from all plastic components.

Belts made entirely of plastic solve most of the above-described problems, but have the shortcoming of lower stiffness (lower modulus of elasticity) and therefore do not allow large distances between wear strips. Also, the reduced stiffness of plastic belts may create some problems for radius belts. For example, when a radius belt rounds a curve, radial compression forces act on the module rows. These forces may cause compression of the plastic belts in this area. In addition, the bending stiffness of plastic belts is reduced. This reduced stiffness negatively affects the bending stiffness of the complete belt, if it is resting on support strips with large distances as common for spiral machines. Accordingly, there is a need for radius belts made entirely of plastic materials that offer an improved stiffness without affecting the ability of the belt to collapse in a curve. It is also desirable to have the stiffness as equal as possible over the full belt width. These belts have particular application for spiral conveyors and other very large radius applications.

SUMMARY OF THE INVENTION

The present invention meets the above-described need by providing a radius belt module having an intermediate section including a cross rib having a corrugated portion extending along at least a portion of the length of the intermediate section. The intermediate section also has a web extending along the length of the intermediate section and disposed adjacent to the cross rib. The module has a first plurality of link ends extending outward from the intermediate section and having a transverse opening defined therein. The link ends are formed by a pair of spaced apart link members that are connected by a end portion. The link ends have a slot or opening defined therein from the top to the bottom of the module. The slot is bordered by the inside walls of the link members. The module also has a second plurality of link ends extending outward from the intermediate section in a direction opposite the first link ends. The second link ends have a transverse opening with an elongated shape. The link ends are formed by a pair of spaced apart link members that are connected by an end portion. The link ends have a slot or opening defined therein. The slot is bordered by the inside walls of the link members. The corrugated portion of the cross rib has a reach bar portion extending between first and second link ends and has a border portion disposed adjacent to the slot formed in the link ends.

BRIEF DESCRIPTION OF THE DRAWINGS

The invention is illustrated in the drawings in which like reference characters designate the same or similar parts throughout the figures of which.

DETAILED DESCRIPTION OF THE INVENTION

Figures 1, 2:
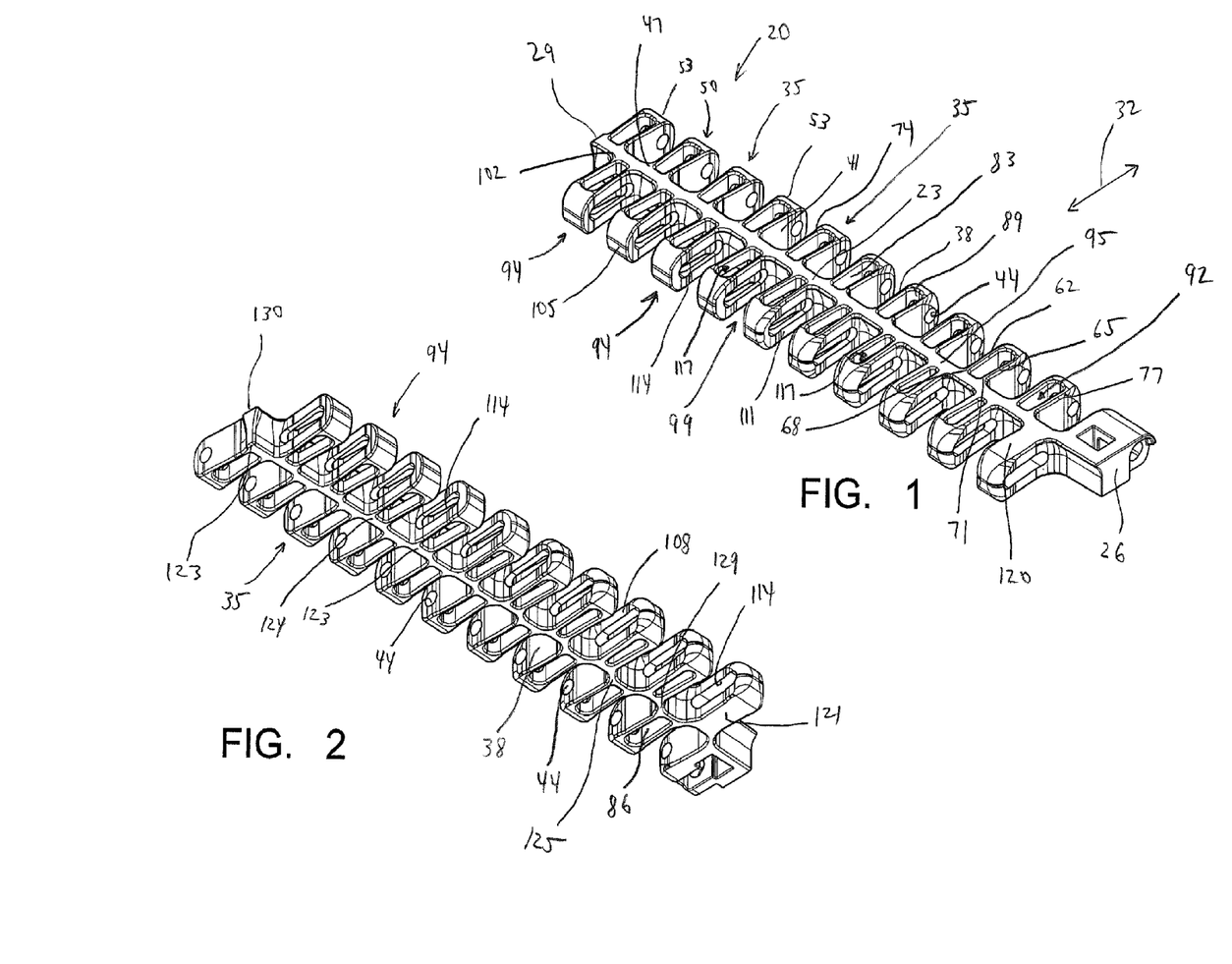
FIG. 1 is a perspective view of an edge module of the present invention.
FIG. 2 is another perspective view of the edge module of FIG. 1.

In FIG. 1, a module 20 has an intermediate section 23 extending from a first edge 26 to a second edge 29 at the opposite side of module 20. The intermediate section 23 extends in a direction transverse to the direction of belt travel indicated by arrow 32. A first plurality of link ends 35 extend from the intermediate section 23 in a direction of belt travel. The link ends 35 have a pair of outer walls 38, 41 defining a transverse thickness. A transverse pivot rod opening 44 extends through the link ends 35 from wall 38 to wall 41. The opening 44 is round and sized to receive a pivot rod for connecting adjacent modules 20. The link ends 35 have a proximal portion 47 that connects to the intermediate section 23, and the link ends 35 have a distal portion 50 with an end wall 53. The first link ends 35 are formed with a pair of spaced apart link members 62 and 65. The link members 62 and 65 may be molded as solid plastic parts with rounded edges. The link members 62, 65 may be disposed approximately parallel or at an angle in spaced apart relation. The link members 62, 65 connect at a proximal end to the intermediate section 23. First ends 68, 71 of the link members 62, 65 form the proximal portion 47 of link ends 35. The second ends 74, 77 of the link members 62, 65 extend to the distal portion 50. Each link member 62, 65 has an inner wall 83, 86 (FIG. 2) disposed on the side opposite from outer walls 38, 41. The distal portion 50 has an inner wall 89 disposed opposite from outer wall 53. The intermediate section 23 has a wall 88 (FIG. 4) at the proximal end of the link members and facing in the direction of belt travel. The inner walls 83, 86, 88, and 89 border a slot 92 that extends through the module 20 from the top surface to the bottom surface.

Figure 4:
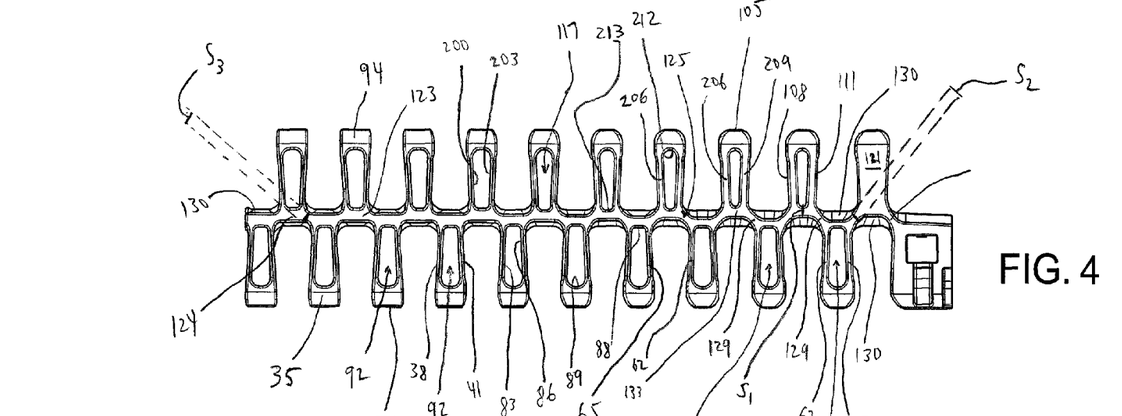
FIG. 4 is a bottom plan view of the module shown in FIG. 1.

A second plurality of link ends 94 extend from the intermediate section 23 in the opposite direction from the first link ends 35. The first and second link ends 35 and 94 have spaces 99 between successive link ends. The link ends 35 and 94 on opposite sides of the intermediate section 23 are offset such that adjacent modules 20 are capable of intercalating such that the link ends 35 fit into the spaces 99 between link ends 94. Link ends 94 have a proximal portion 102 connected to the intermediate section 23 and a distal portion 105 disposed opposite from the proximal portion 102. Link ends 94 have side walls 108, 111 forming a transverse thickness. An elongated opening 114 extends through the link end 94 from wall 108 to wall 111. As will be evident to those of ordinary skill in the art based on this disclosure, the opening 114 is elongated as shown in FIGS. 1 and 2 so that when the belt negotiates a curve, the end of the modules 20 at the inside of the curve can "collapse" and the end of the modules 20 at the outside of the curve can "fan" out as will be described in greater detail herein. When the modules are connected by the pivot rod 59 (FIG. 5) to form a belt, the pivot rod 59 extends through the round openings 44 and the elongated openings 114 in alternating fashion. As best shown in FIG. 4, the second link ends 94 also include a slot 117 that is bordered by inside walls 200, 203 of the link members 206, 209 on opposite sides and is bordered by wall 213 of the intermediate section 23 and the inside wall 212 of the distal portion 105 at the opposite end. One of the link ends 94 may be formed with closed top and bottom surfaces 120, 121 that increase the strength of the module 20.

Figure 3:
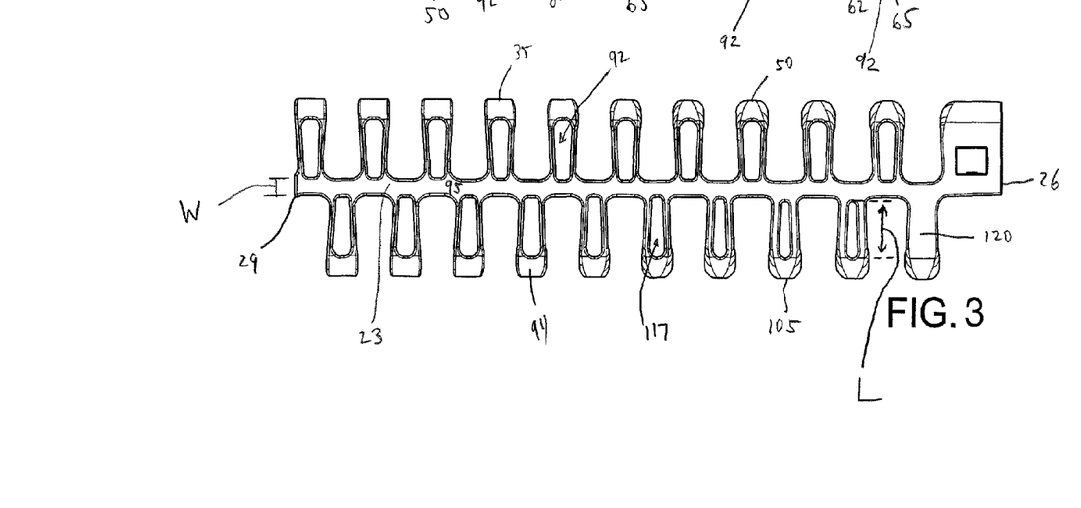
FIG. 3 is a top plan view of the edge module shown in FIG. 1.

As shown in FIGS. 1 and 3, the top surface 95 of intermediate section 23 has an elongated approximately rectangular shape with a substantially uniform width W along its length between the first edge 26 and the second edge 29.

Referring to FIGS. 2 and 4, at the bottom of the module 20 the intermediate section 23 is formed by a cross rib 123 that extends substantially transverse to the direction of belt travel. The cross rib 123 includes a substantially straight portion 124 at one end of the module 20, which is toward the middle of the belt when the module 20 is assembled into a belt, and has a corrugated section 125 at the opposite side where the module 20 forms the side of the belt. In the corrugated section 125, the cross rib 123 includes reach bar portions 129 that extend between the link ends 35 and 94. The intermediate section 23 extends from a bottom surface on the cross rib 123 to the top surface 95. The top surface 95 is formed by a web 130 that is wider than the cross rib 123. The web 130 has approximately uniform width in the longitudinal direction. The difference in width between the cross rib 123 and the web 130 is smaller toward the middle of the module 20, and the difference is greater toward the side edge 26 of the module 20 because of the corrugation of the cross rib 123 to form reach bar portions 129 and to provide space for collapsing at the inside of a turn.

Turning to FIG. 4, at the end of the module 20 toward side edge 26, the cross rib 123 forms reach bar portions 129 between successive links and forms a border portion 133 where the cross rib 123 forms a boundary of the slot 92. The thickness $S_3$ of the cross rib 123 between opposed link members and the thickness $S_2$ of the reach bar 129 is preferably equal or nearly equal throughout the modules. However, this relationship is possible only for certain collapse factors. For very small collapse factors it may be necessary to reduce the thickness of the cross rib 123. For example, the thickness of the cross rib 123 in the reach bar portion 129 toward the side edge 26 may be reduced in order to provide space for the distal portion 50, 105 of the link ends 35, 94 to move inward to collapse around the turns. The thickness S is measured from side to side of the cross rib 123 (perpendicular to the lengthwise direction of the cross rib 123) as it extends in serpentine fashion toward the side edge 26 of the module 20 as shown in FIG. 4. The thickness $S_1$ of the cross rib 123 in the border portion 133 may be increased by altering the slot length L (FIG. 3). The thickness $S_2$ (FIG. 4) of the cross rib 123 where it forms reach bar portion 129 between successive links is limited by the need for space for collapsing at the inside of turns. In order to strengthen the belt, the thickness $S_1$ of the cross rib 123 at the border portion 133 may be increased such that it is greater than the thickness $S_2$ of the cross rib 123 at the reach bar portion 129.

The stiffness of the belt may further be increased by the arrangement of the link members 62, 65 and the link members 206 and 209. Link member 65 on Link end 35 is disposed opposite from link member 206 on link end 94. The opposed link members 65, 206 are arranged such that they join into the cross rib 123 in close proximity to further strengthen the belt. The point where link member 62 connects to the cross rib 123 may also be located in close proximity with the point where link member 203 connects to the cross rib 123.

Figure 5:
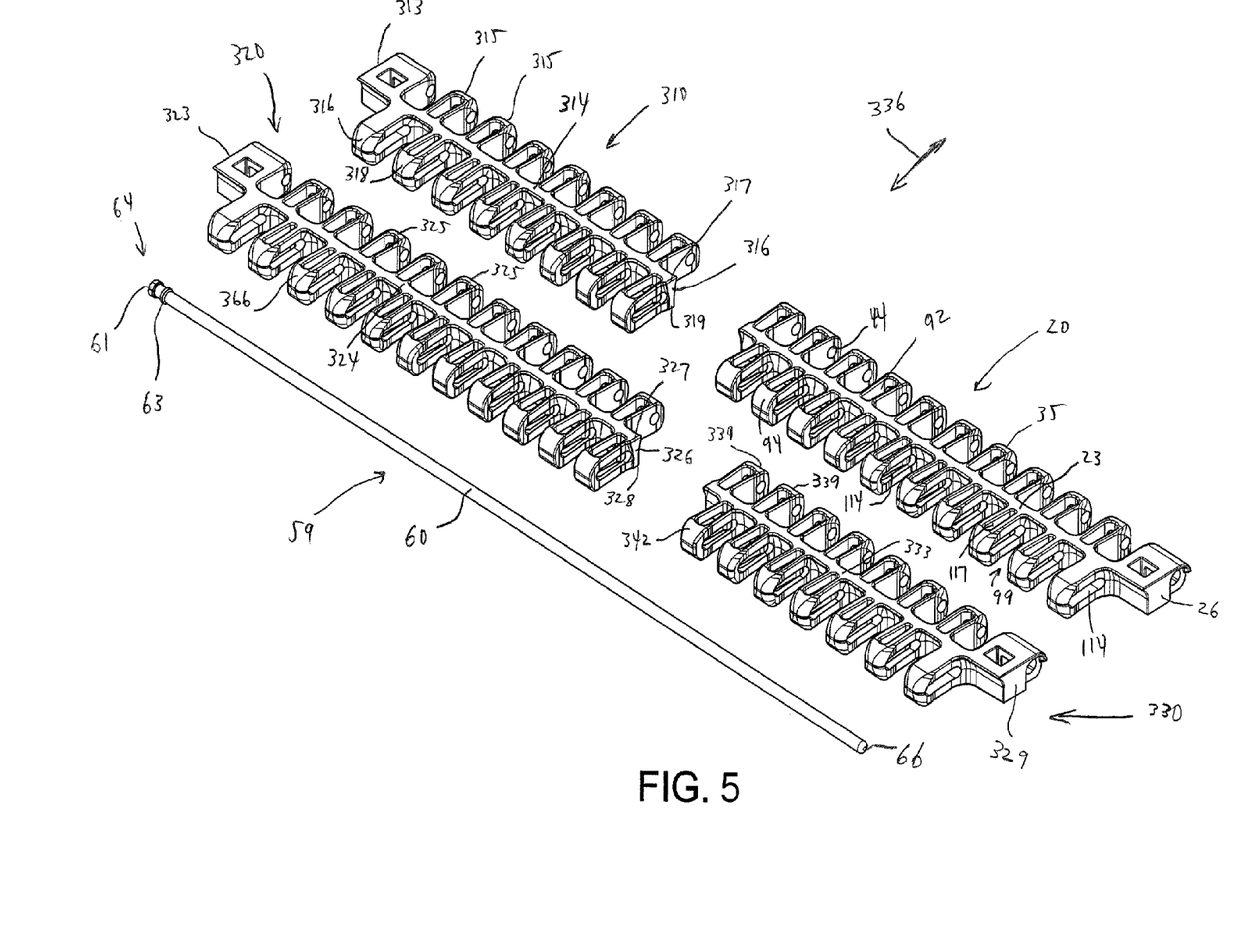
FIG. 5 is a perspective view of the components of the belt of the present invention.

A bricklayed belt 300 (FIG. 6) may be formed from the components shown in FIG. 5. Module 20 may be connected to modules 310, 320 and 330 by means of the pivot rod 59. Side edge 26 of module 20 forms the edge of belt 300 and aligns with side edge 329 of module 330. Module 330 has an intermediate section 333 extending transverse to the direction of belt travel indicated by arrow 336. A first plurality of link ends 339 extend in a first direction. A second plurality of link ends 342 extend in a second direction opposite to the first direction. The link ends 339 are formed in the same manner as described above in connection with link ends 35 and 94. Link ends 339 fit into the spaces 99 between link ends 35.

Module 310 has a side edge 313 and an opposite edge 316 toward the middle of the belt 300. AS shown, the top surface of the intermediate section 314 is formed with a web 317 that is wider than the cross rib 319. A first plurality of link ends 315 and a second plurality of link ends 318 extend in opposite directions from the intermediate section 314. The first and second plurality of link ends 315 and 318 are formed in the manner described above in connection with link ends 35 and 94.

Module 320 has a side edge 323 and an opposite edge 326 disposed toward the middle of the belt 300. As shown the top surface of the intermediate section 324 is formed with a web 327 that is wider than the cross rib 328. A first plurality of link ends 325 and a second plurality of link ends 366 extend in opposite directions from the intermediate section 324. The first and second plurality of link ends 325 and 366 are formed in the manner described above in connection with link ends 35 and 94.

After the link ends of the four modules are intercalated and the pivot rod openings are aligned in the transverse direction, the belt 300 may be assembled by inserting the pivot rod 59 through the aligned openings. As shown, the pivot rod 59 has an elongate substantially cylindrical body 60 with a head 61 and a retaining ring 63 disposed at a first end 64. The cylindrical body 60 terminates at a second end 66. As will be evident, to those of ordinary skill in the art, based on this disclosure other pivot rods may also be used to connect the modules. The pivot rod 59 shown has the advantage that it can be inserted and removed from one side of the belt 300. The retaining ring 63 prevents the pivot rod 59 from sliding out of the modules in the axial direction and therefore holds the modules together to form the belt 300.

Figure 6:
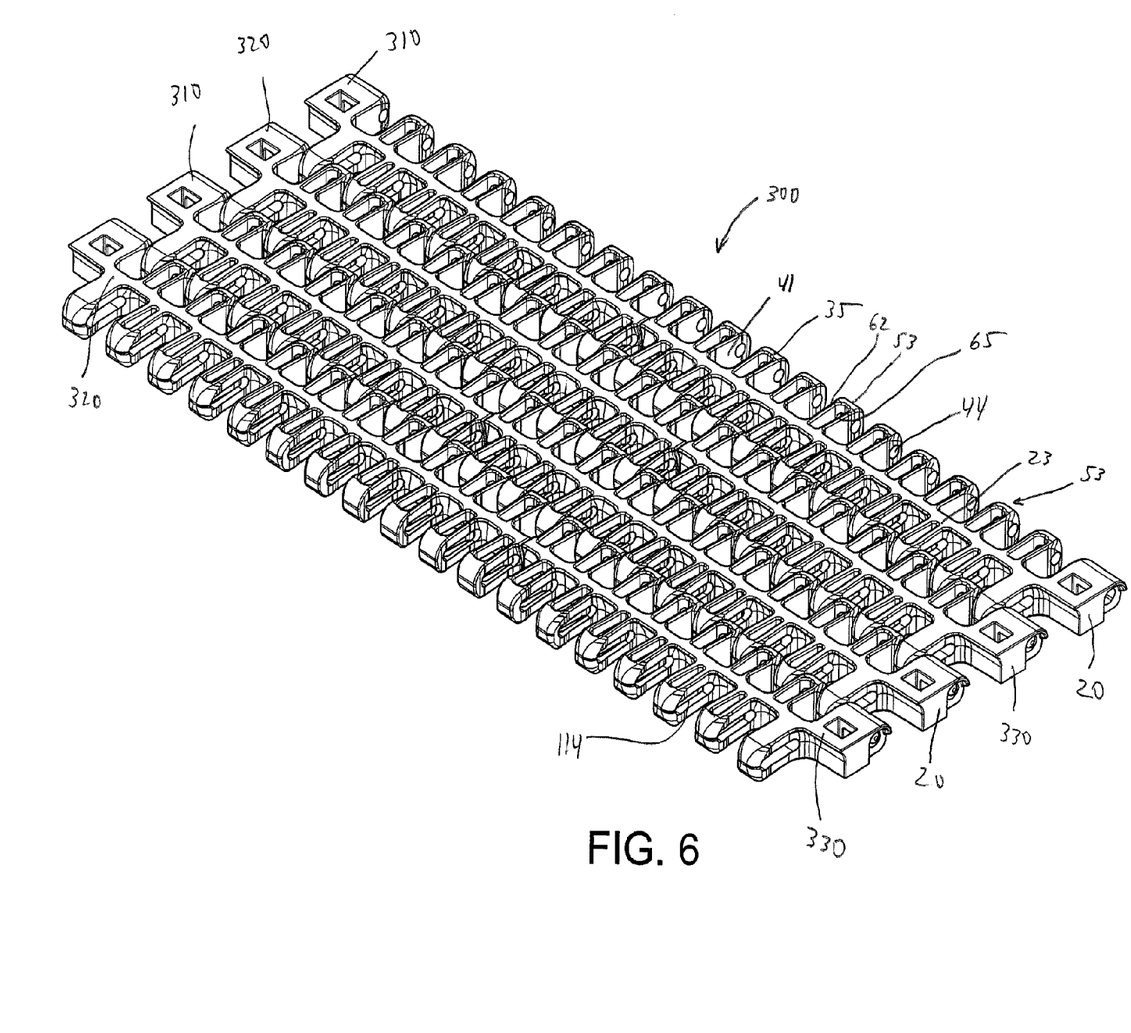
FIG. 6 is a perspective view of a belt of the present invention in a straight running condition.
Figure 7:
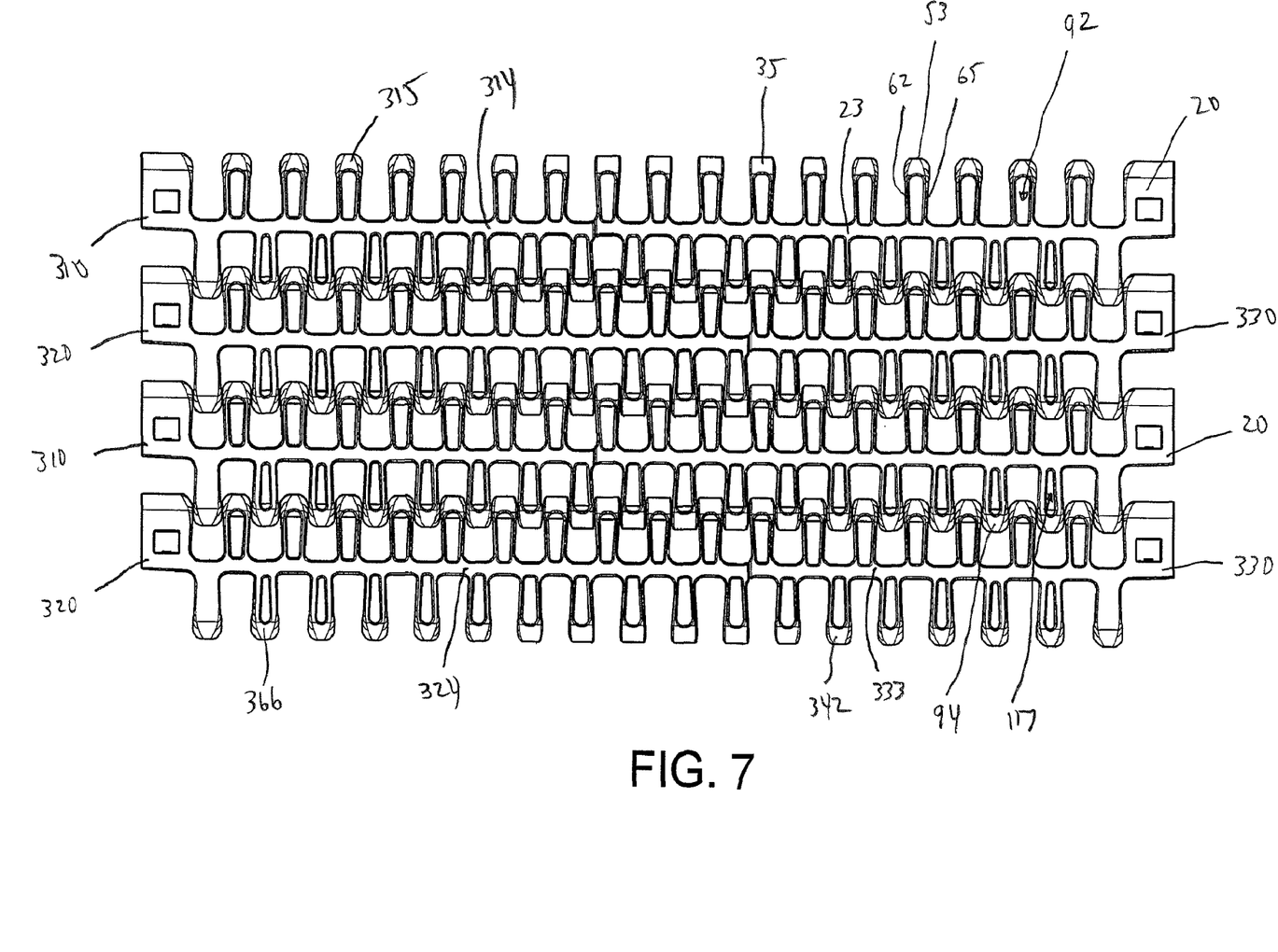
FIG. 7 is a top plan view of the belt shown in FIG. 6.

Turning to FIGS. 6 and 7, the belt 300 is shown in a straight running condition where the modules are spaced apart equally on each side edge. The link ends of each module are disposed in the spaces between link ends of the adjacent module and the transverse pivot rod openings are aligned to receive the pivot rod 59. The modules are capable of being connected by pivot rods 59 to form an endless belt 300 capable of articulating about a sprocket (not shown). As shown at the side edges on both sides of the belt 300, the link ends disposed at the side edges of the belt do not have to extend very far into the openings of adjacent modules at the side edges of belt 300 when the belt is in the straight running condition.

Figure 8:
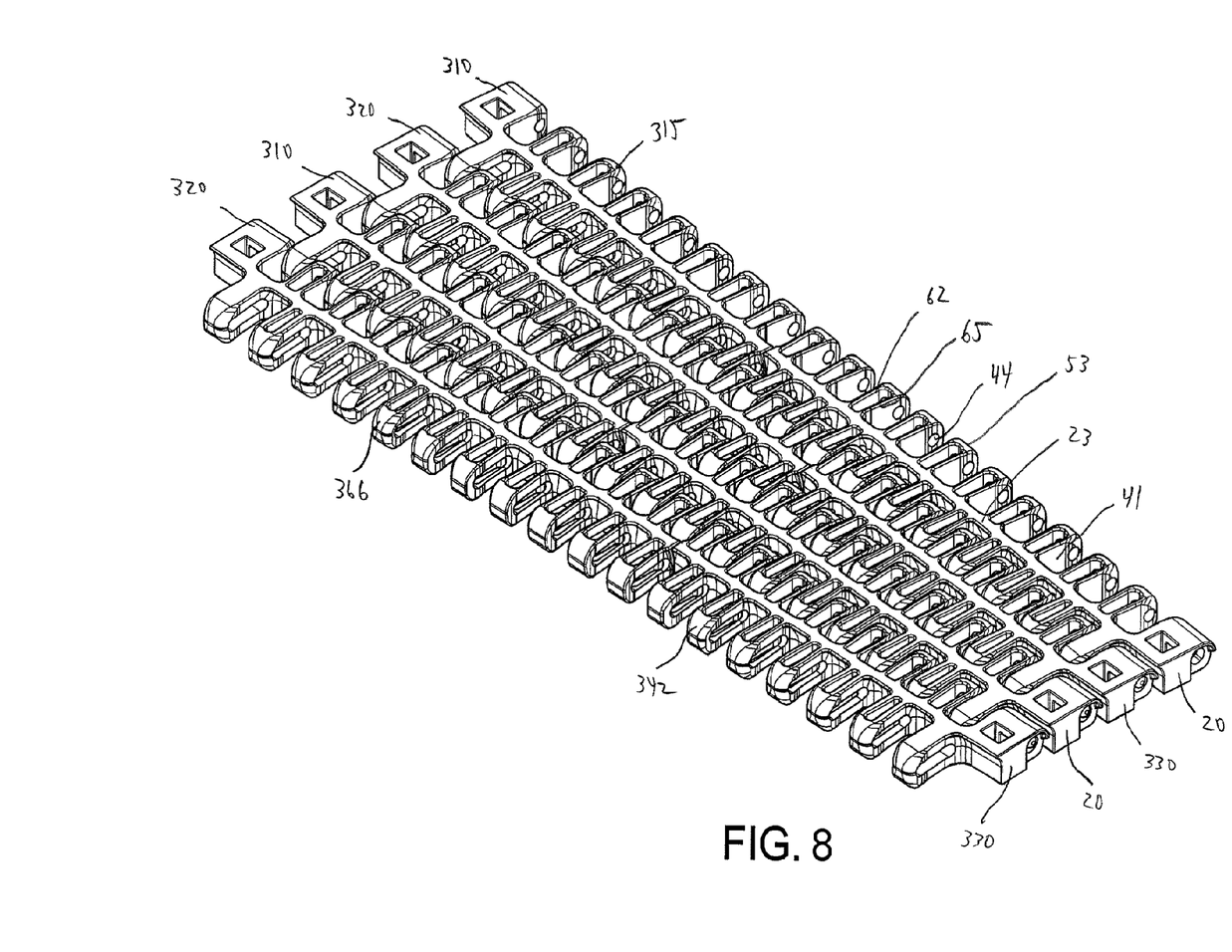
FIG. 8 is a perspective view of a belt of the present invention shown rounding a curve in a "collapsed" condition; and, FIG. 9 is a top plan view of the belt shown in FIG. 8.
Figure 9:
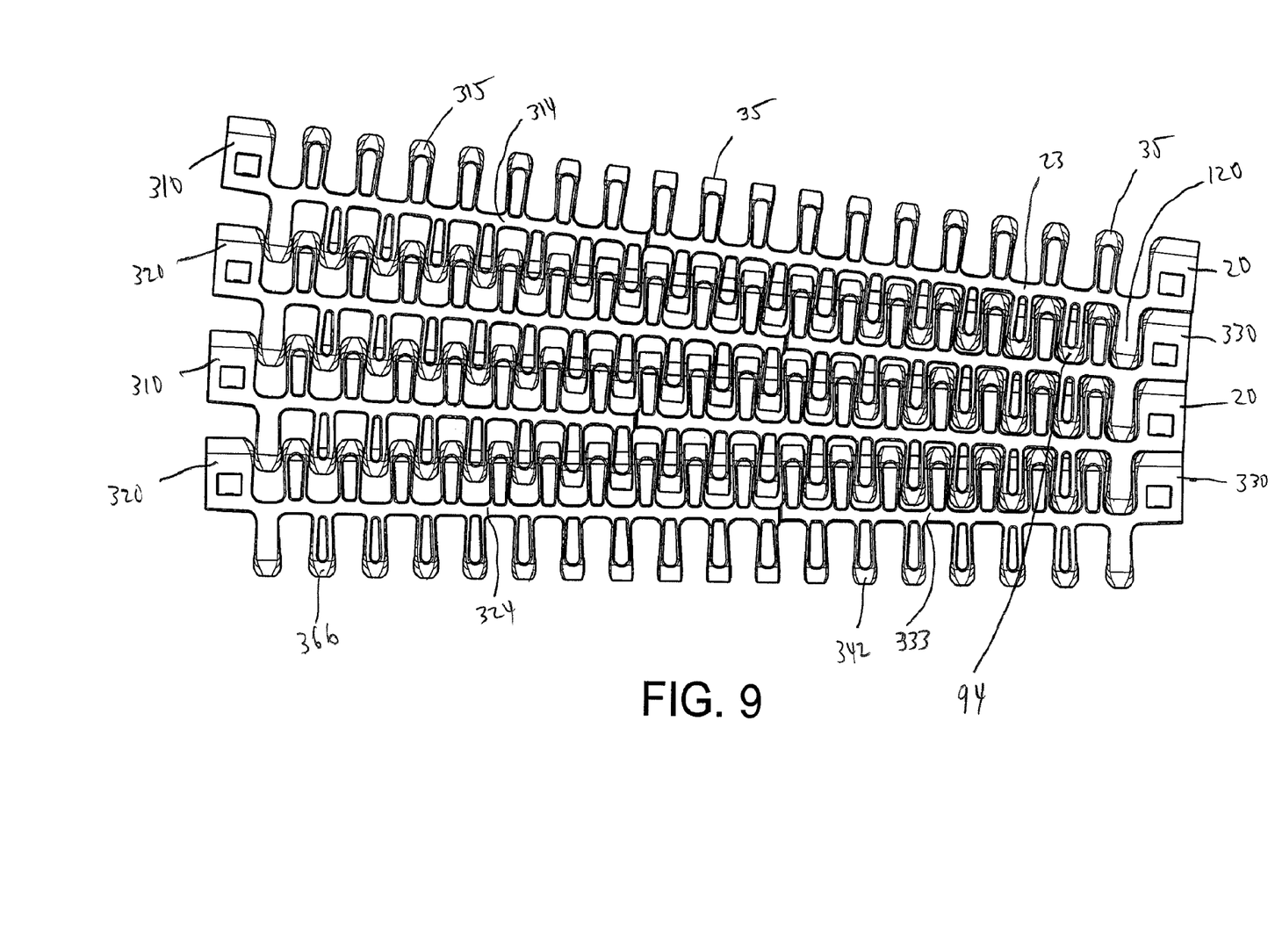

Turning to FIGS. 8 and 9, the belt 300 is shown in the "collapsed" condition as it negotiates a curve. On the right hand side of the figure, the modules are collapsed as they would be around the inside curve of a turn. As shown in FIG. 9, the link ends at the edge of the module corresponding to the inside of the curve are collapsed and extend as far as possible into the openings between adjacent link ends. In order for the link ends to extend as far as possible into the adjacent spaces, the cross rib 123 is corrugated at the side edges. As shown on the left hand side of FIG. 8, the opposite edge of the modules "fans" out such that there is a maximum distance between the link ends of adjacent modules.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention as defined by the appended claims.

What is claimed is:

1. A belt module comprising:
an intermediate section including a cross rib having a corrugated portion extending along at least a portion of the length of the intermediate section and the intermediate section having a web extending along the whole length of the intermediate section and adjacent to the cross rib;
a plurality of first link ends extending outward from the intermediate section and having a transverse opening defined therein and the transverse opening of the plurality of first link ends having a profile area, the link ends having a pair of spaced apart link members and having an end portion connecting the link members, the link ends having a slot defined therein which comprises an opening extending from a top surface of the link end to the bottom surface of the link end; and
a plurality of second link ends extending outward from the intermediate section in a direction opposite the first link ends, the second link ends having a transverse opening defined therein and the transverse opening of the plurality of second link ends having a profile area greater than the profile area of the transverse opening of the plurality of first link ends, the link ends having a pair of spaced apart link members and having an end portion connecting the link members, the link ends having a slot defined therein which comprises an opening extending from a top surface of the link end to the bottom surface of the link end; and,
wherein the corrugated portion of the cross rib comprises alternate reach bar portions extending between first and second link ends and border portions disposed adjacent to the slots formed in the link ends.

2. The belt module of claim 1, wherein the cross rib includes a substantially straight portion.

3. The belt module of claim 2, wherein the substantially straight portion is disposed toward the middle of the belt when the modules are intercalated.

4. The belt module of claim 1, wherein at least one of the link members of the first plurality of link ends connects with the intermediate section in close proximity to where at least one of the link members of the second plurality of link ends connects with the intermediate section.

5. The belt module of claim 1, wherein the border portion of the cross rib has a thickness that is greater than the thickness of the reach bar portion.

6. The belt module of claim 1, wherein the thickness of the cross rib between opposed link members is approximately equal.

7. The belt module of claim 1, wherein the thickness of the cross rib between opposed link members is reduced toward the belt edge.

8. The belt module of claim 1, further comprising at least one link end having closed top and bottom surfaces.

9. The belt module of claim 1, wherein the web is wider than the cross rib.

10. The belt module of claim 1, wherein the difference between the width of the web and the width of the cross rib at the side edge is greater than the difference between the width of the web and the width of the cross rib near the edge opposite from the side edge.

11. A modular belt, comprising:
a plurality of belt modules having an intermediate section including a cross rib having a corrugated portion extending along at least a portion of the length of the intermediate section and a web extending along the whole length of the intermediate section and adjacent to the cross rib;
a plurality of first link ends extending outward from the intermediate section and having a transverse opening defined therein and the transverse opening of the plurality of first link ends having a profile area, the link ends having a pair of spaced apart link members and having an end portion connecting the link members, the link ends having a slot defined therein which comprises an opening extending from a top surface of the link end to the bottom surface of the link end; and
a plurality of second link ends extending outward from the intermediate section in a direction opposite the first link ends, the second link ends having a transverse opening defined therein and the transverse opening of the plurality of second link ends having a profile area greater than the profile area of the transverse opening of the plurality of first link ends, the link ends having a pair of spaced apart link members and having an end portion connecting the link members, the link ends having a slot defined therein which comprises an opening extending from a top surface of the link end to the bottom surface of the link end;
wherein the corrugated portion of the cross rib comprises alternate reach bar portions extending between first and second link ends and border portions disposed adjacent to the slots formed in the link ends; and,
a plurality of pivot rods disposed through aligned transverse openings in intercalated belt modules.

12. The modular belt of claim 11, wherein the cross rib includes a substantially straight portion.

13. The modular belt of claim 12, wherein the substantially straight portion is disposed toward the middle of the belt when the modules are intercalated.

14. The modular belt of claim 11, wherein at least one of the link members of the first plurality of link ends connects with the intermediate section in close proximity to where at least one of the link members of the second plurality of link ends connects with the intermediate section.

15. The modular belt of claim 11, wherein the border portion of the cross rib has a thickness that is greater than the thickness of the reach bar portion.

16. The modular belt of claim 11, wherein the thickness of the cross rib between opposed link members is approximately equal.

17. The modular belt of claim 11, wherein the thickness of the cross rib between opposed link members is reduced toward the belt edge.

18. The modular belt of claim 11, further comprising at least one link end having closed top and bottom surfaces.

19. The modular belt of claim 11, wherein the web is wider than the cross rib.

20. The modular belt of claim 11, wherein the difference between the width of the web and the width of the cross rib at the side edge is greater than the difference between the width of the web and the width of the cross rib near the edge opposite from the side edge.

21. A method of forming a radius belt, comprising:
providing a plurality belt modules having an intermediate section including a cross rib having a corrugated portion extending along at least a portion of the length of the intermediate section and a web extending along the whole length of the intermediate section and adjacent to the cross rib; a plurality of first link ends extending outward from the intermediate section and having a transverse opening defined therein and the transverse opening of the plurality of first link ends having a profile area, the link ends having a pair of spaced apart link members and having an end portion connecting the link members, the link ends having a slot defined therein which comprises an opening extending from a top surface of the link end to the bottom surface of the link end; and a plurality of second link ends extending outward from the intermediate section in a direction opposite the first link ends, the second link ends having a transverse opening defined therein and the transverse opening of the plurality of second link ends having a profile area greater than the profile area of the transverse opening of the plurality of first link ends, the link ends having a pair of spaced apart link members and having an end portion connecting the link members, the link ends having a slot defined therein which comprises an opening extending from a top surface of the link end to the bottom surface of the link end; wherein the corrugated portion of the cross rib comprises alternate reach bar extending between first and second link ends and border portions disposed adjacent to the slots formed in the link ends;

intercalating adjacent modules such that the link ends of a first module extend into the spaces between the link ends of an adjacent second module, the modules being aligned such that the transverse openings of the first link ends align with the transverse openings of the second link ends of the adjacent module;

inserting pivot rods through the aligned transverse openings of adjacent modules to form an endless belt capable of articulating about a sprocket.

22. The belt module of claim 1, wherein the link members of a pair of spaced apart link members are disposed at an angle in spaced apart relation.

23. The modular belt of claim 11, wherein the link members of a pair of spaced apart link members are disposed at an angle in spaced apart relation.

* * * * *